(No Model.)

W. H. HALLOCK.
LUBRICATOR.

No. 522,204.　　　　　　　　Patented July 3, 1894.

Witnesses.
G. W. Brainard,
Maurice Conway.

Inventor.
William H. Hallock
By Jno. H. Whipple
Atty

UNITED STATES PATENT OFFICE.

WILLIAM H. HALLOCK, OF WESTERN UNION, WISCONSIN, ASSIGNOR OF ONE-HALF TO JAMES C. BOND, OF CHICAGO, ILLINOIS.

LUBRICATOR.

SPECIFICATION forming part of Letters Patent No. 522,204, dated July 3, 1894.

Application filed March 14, 1894. Serial No. 503,590. (No model.)

*To all whom it may concern:*

Be it known that I, WILLIAM H. HALLOCK, of Western Union, in the county of Racine and State of Wisconsin, have invented certain new and useful Improvements in Lubricator Cups or Holders, of which the following is a specification.

My invention relates to lubricator cups or holders designed to feed solid or semi-solid grease to a shaft or journal, and to means for equalizing the action of a coiled spring or springs employed to actuate the device; and the objects of my improvements are, first: to provide a lubricator cup or holder adapted to hold a stick of hard grease or a quantity of soft grease with suitable spring action which shall be automatic in operation, to maintain a constant application of the lubricant in order to supply waste or wear of the operating shaft thereon, and second, to provide means for equalizing such spring action so as to produce the same amount of force to the lubricant when the cup is nearly exhausted as it does when the cup is full.

It is a well known fact that a coiled spring under full tension gradually loses its force under relaxation. I employ a spring bar in combination with the spring coil and placed at an inclination thereto, and a friction brake which is adapted to exert its maximum pressure upon said inclined spring bar at the point or time when the coiled spring is under maximum tension; the friction brake being adapted by the inclination of the spring bar to gradually decrease its pressure upon said spring bar automatically as the force of the coiled spring is spent in relaxation. In this manner the action of the spring is made uniform throughout the entire period of its operation. So far as this feature of my invention is concerned it is applicable to other uses than that of working lubricators and I do not wish to be understood as intending to limit the scope of my claims, in so far as this feature of my invention is concerned, to any particular use.

Another object of my improvement is to produce an expansible plunger in the lubricator cup or cylinder which will prevent the escape of semi-liquid grease.

I attain these objects by the means illustrated in the accompanying drawings, in which—

Figure 1:
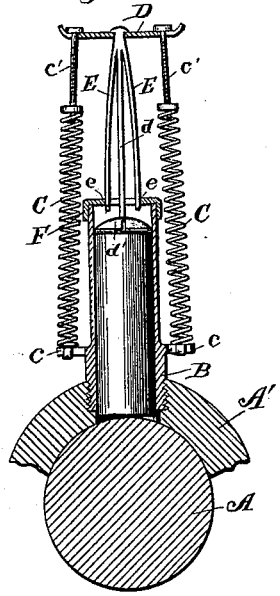
Figure 2:
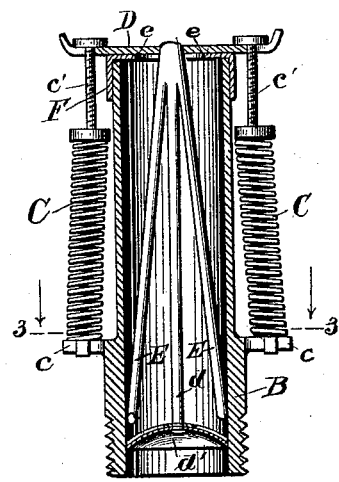
Figure 5:
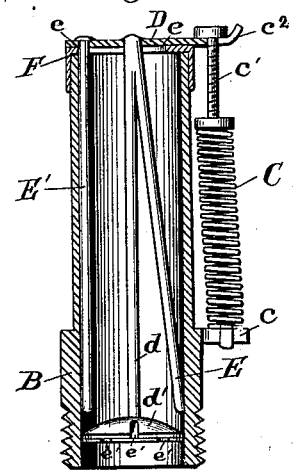
Figure 3:
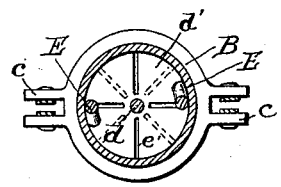
Figure 4:
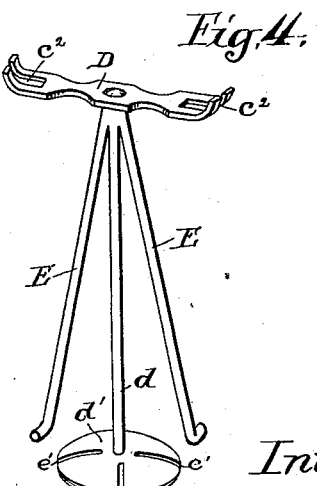

Figure 1 represents a central, vertical section of a lubricator cup or holder embodying my invention, the journal box and journal being shown in fragment, and the plunger being extended as it is when the lubricant is in the cup. Fig. 2 is a similar view to that shown in Fig. 1, but shows the apparatus detached from the journal box and the plunger in its reverse position. Fig. 3 is a horizontal section taken on the line 3—3 of Fig. 2 and looking in the direction of the arrows. Fig. 4 is a detail showing a perspective view of the plunger and the part by which it is actuated, detached from the apparatus. Fig. 5 is a vertical, central section showing a modification of my invention.

In the drawings, A is the journal to which the lubricant is to be applied; A' the journal boxing having the lubricator cup or cylinder B screw-threaded therein in the ordinary manner.

C designates a coiled spring which is attached by means of a lug $c$ to the side of the lubricator cup. I employ one or more of the coiled springs $c$. Said coiled springs are attached to a cross head D which carries the plunger rod $d$ having the plunger $d'$ attached thereto. I prefer to attach the coiled springs to the cross head B by means of screw bolts $c'$ engaging with said cross head and with a nut secured to the end of the coiled spring whereby the tension of the coiled springs may be regulated; and to facilitate the detachment of the screw bolt $c'$ from the cross head, I provide said cross heads with an open slot or slots $c^2$ and with upturned ends, the slot being adapted to admit the bolt and the upturned ends being adapted to prevent the head of the bolt from slipping out unless when the head is raised above said upturned ends, which can readily be done when it is desired to detach the coiled springs from the cross head. There are also supported upon the cross head D preferably two inclined spring bars E. The cap F of the cup is provided with a slot $e\,e$ adapted to allow the plunger rod D, and the spring bars E, to pass through the same as the plunger is worked. The spring bar or bars E are supported upon an incline relatively to the coiled springs C or the line of their action, and the extreme ends of the inclined bars bear against the inside of the cylindrical cup B for a part of the way, and against the ends of the slot $e\,e$ for a part of the way, as the plunger is worked in said cup; said bearing points forming a friction brake on the inclined spring bars, which are made yielding so as to spring in some when coming under the influence of the most contracted part of such friction brake, which is located at the point of said slot $e\,e$ in the cap.

The modification shown in Fig. 5 has but one inclined spring bar E instead of two, as shown in the other views. In this construction there is also shown a rod E', which is attached to the cross head B and working in the slot $e\,e$, which is somewhat extended, and whose function is to aid in holding the plunger rod D in its parallel relation with the center or axial line of the cylindrical cup B and to aid in supporting the inclined spring bar E in its proper relation with the friction brake. As the coiled springs are put under tension, as they are when the lubricant is put in the cup and as illustrated in the drawings, Fig. 1, the inclined spring bar E acts under the influence of the most contracted part of the friction brake at $e\,e$ so as to bring the maximum pressure of said friction brake to bear upon said inclined spring bar at the time of maximum tension of the coiled springs so that the friction brake will afford considerable resistance to the return action of the springs, which resistance, owing to the inclination of the spring bar is made to decrease gradually and proportionately to the decreasing action or force of the coiled springs which is caused by their relaxation and thereby a uniform action or force is maintained in the coiled springs throughout the entire movement of the plunger, the tip ends of the springs striking the interior of the cylindrical cup B just previous to said inclined bar's passing out of contact with the most contracted part of said friction brake at the point $e$.

The plunger D' is made of two concave disks, each of which has four radial slots $e'$, the disks being superposed so that said slots in the different disks will fall in different lines and the unslotted portion of one disk covering the slotted part of the other so as to make of the plunger a complete cover to the caliber of the cylindrical cup. As a consequence of this construction, resulting partly from the concavity of the disks and partly from the radial slots therein, the plunger is made expansible by the resistance of the lubricant as it is being forced out of the cup by the action of the plunger. This expansibility of the plunger will cause it to at all times completely fill the cylinder and prevent any escape of the lubricant behind the plunger.

Having thus fully described my invention, what I claim, and desire to secure by Letters Patent, is—

1. Means for equalizing coiled spring action which consists in the combination of two pieces connected so that one is movable relatively to the other, a coiled spring having one of its ends connected with each of said pieces, a bar supported upon one of said pieces and having a friction face extended obliquely to the line of action of the coiled spring, and a brake supported upon the other of said pieces and being in contact with said friction face, the arrangement of said parts being substantially as shown to produce resilient stress between the friction face and the brake and maximum stress at the time of maximum tension of the coiled spring adapted to decrease gradually as the tension of the coiled spring relaxes, as specified.

2. An automatic lubricator comprising a cylindrical cup, a plunger adapted to work in the cup, a coiled spring having one end connected with the cup and the other end connected with the plunger for actuating the same, a bar supported upon the plunger and having a friction face extended obliquely to the line of action of the coiled spring and a brake supported upon the cup and being in contact with the friction face, the arrangement of parts being substantially as shown to produce resilient stress between the friction face and the brake, said stress being maximum at the time of maximum tension of the coiled spring and adapted gradually to decrease as the tension of the coiled spring relaxes, as specified.

3. In combination with a lubricator cup, a plunger, its rod and a connected cross head, coiled springs connected at one end with said cup and at the other end with the cross head, screw bolts between the coiled springs and their connection at one end for regulating the tension of said springs, and spring friction bars attached to said cross head and having their opposite ends bearing against the interior of the lubricator cup, as specified.

4. In combination with a lubricator cup, a plunger, its rod and a connected cross head, coiled springs having one end connected with the lubricator cup and the other end connected with the cross head, inclined spring friction bars attached to said cross head, and a cap upon the lubricator cup provided with an opening in which said friction bars can work, the edges of said opening affording frictional resistance to said friction bars, as specified.

5. In combination with a cylindrical lubricator cup, a plunger, its rod and a connected cross head, coiled springs connecting the cross head with the lubricator cup for actuating the plunger, a cap provided with an opening of less diameter than the interior of the lubricator cup, and inclined spring friction bars supported on the cross heads and extending through the opening of the cap into the lubricator cup, the sides of said friction bars being adapted to bear upon the edges of the opening in the cap during one portion of the relaxation of the coiled springs and the tip ends of the friction bars being adapted to bear upon the interior of the lubricator cup during another portion of said relaxation of the coiled springs, as specified.

6. In a lubricator the plunger head comprising superposed concave disks provided with radial slots the unslotted portions of one disk being placed upon the slotted portions of the other disk to give radial expansibility to the plunger as specified.

WILLIAM H. HALLOCK.

Witnesses:
 LEWIS P. KOPP,
 JAMES C. BOND.